(12) United States Patent
Horiguchi et al.

(10) Patent No.: US 6,537,692 B1
(45) Date of Patent: Mar. 25, 2003

(54) FUEL CELL APPARATUS

(75) Inventors: Munehisa Horiguchi, Aichi (JP); Kenji Kato, Aichi (JP)

(73) Assignee: Kabushikikaisha Equos Research (JP)

( * ) Notice: Subject to any disclaimer, the term of this patent is extended or adjusted under 35 U.S.C. 154(b) by 14 days.

(21) Appl. No.: 09/712,944

(22) Filed: Nov. 16, 2000

(30) Foreign Application Priority Data

Nov. 17, 1999 (JP) .............................. 11-326999
May 12, 2000 (JP) ........................ 2000-141016

(51) Int. Cl.$^7$ ................................. H01M 8/04
(52) U.S. Cl. .................... 429/22; 429/13; 429/23; 429/24
(58) Field of Search ......................... 429/13, 22, 23, 429/24, 25

(56) References Cited

U.S. PATENT DOCUMENTS

| | | | |
|---|---|---|---|
| 4,000,003 A | 12/1976 | Baker et al. | 429/7 |
| 4,324,844 A | 4/1982 | Kothmann | 429/26 |
| 4,585,708 A | 4/1986 | Abens et al. | 429/17 |
| 4,826,741 A | 5/1989 | Aldhart et al. | 429/19 |
| 5,085,949 A | 2/1992 | Sanderson et al. | 429/23 |
| 5,139,894 A | 8/1992 | Mizuno et al. | 429/9 |
| 5,316,870 A | 5/1994 | Ohga | 429/24 |
| 5,360,461 A | 11/1994 | Meinzer | 48/61 |
| 5,432,020 A | 7/1995 | Fleck | |
| 5,434,016 A | 7/1995 | Benz et al. | 429/13 |
| 5,441,819 A | 8/1995 | Voss et al. | 429/13 |
| 5,645,950 A | 7/1997 | Benz et al. | |
| 5,766,786 A | 6/1998 | Fleck et al. | 429/17 |
| 5,958,613 A | 9/1999 | Hamada et al. | 429/26 |
| 6,013,385 A | 1/2000 | DuBose | 429/17 |
| 6,117,577 A * | 9/2000 | Wilson | 429/22 X |
| 6,238,814 B1 * | 5/2001 | Horiguchi et al. | 429/20 |
| 6,268,074 B1 * | 7/2001 | Siepierski et al. | 429/13 |
| 6,294,277 B1 * | 9/2001 | Ueno et al. | 429/22 |
| 6,306,532 B1 * | 10/2001 | Kurita et al. | 429/22 |
| 6,350,536 B1 * | 2/2002 | Ban et al. | 429/13 |

FOREIGN PATENT DOCUMENTS

| | | |
|---|---|---|
| EP | 301757 | 2/1989 |
| EP | 817298 A1 | 2/1989 |
| JP | 59-117074 | 7/1984 |
| JP | 60-136178 | 7/1985 |
| JP | A05-054900 | 3/1993 |
| JP | 6-338338 | 12/1994 |
| JP | 7-14599 | 1/1995 |
| JP | A07-220746 | 8/1995 |
| JP | A07-263010 | 10/1995 |
| JP | 8-96818 | 4/1996 |
| JP | A11-191423 | 7/1997 |
| JP | 9-266004 | 10/1997 |
| JP | 10-106600 | 4/1998 |
| JP | A10-172593 | 6/1998 |
| JP | 10-247505 | 9/1998 |
| JP | A10-255828 | 9/1998 |
| JP | A11-135133 | 5/1999 |
| JP | A11-162490 | 7/1999 |
| WO | 95/25357 | 9/1995 |
| WO | 98/45889 | 10/1998 |
| WO | 99/05740 | 2/1999 |

OTHER PUBLICATIONS

Nguyen, T.V. et al: "A Water and Heat Management Model for Proton–Exchange–Membrane Fuel Cells" Journal of Electrochemical Society, vol. 140, No. 8, Aug. 1, 1993.

* cited by examiner

Primary Examiner—Stephen Kalafut
(74) Attorney, Agent, or Firm—Lorusso & Loud (57) ABSTRACT

The present invention provides a direct water injection type fuel cell apparatus which can effectively cool an air electrode in a fuel cell main body. The apparatus supplies water to the surface of the air electrode in a liquid state and the amount of process air supplied to the air electrode is controlled to an optimum.

23 Claims, 12 Drawing Sheets

FUEL CELL APPARATUS

BACKGROUND OF THE INVENTION

The present invention relates to a fuel cell apparatus, and in particular, to an improvement of a so-called PEM type fuel cell apparatus having a polymer solid electrolyte film. More particularly, the present invention relates to an improvement of a water direct injection type, in particular, to a fuel cell apparatus with direct spraying of water onto an air electrode from a nozzle.

A cell main body of the PEM type fuel cell apparatus has a structure including a polymer solid electrolyte film held between a fuel electrode (also called as a hydrogen electrode in the case of using hydrogen as a fuel electrode) and an air electrode (also called an "oxygen electrode" or "oxidation electrode" because oxygen is a reaction gas. A reaction layer including a catalyst is interposed between the air electrode and the electrolyte film.

The fuel cell having the above structure is generated in an electromotive force in the following manner. More specifically, a fuel gas is supplied to a fuel electrode side (anode), and then, an oxidation gas is supplied to an air electrode side; as a result, electricity is generated with the progress of electrochemical reaction, and then, the electrocity thus generated is picked up by an external circuit.

More specifically, a hydrogen ion obtained by the fuel electrode (anode) is moved in the form of a ion ($H_3O^+$) to the air electrode (cathode) side in an electrolyte film containing water. Moreover, an electron obtained by the fuel electrode (anode) is moved to the air electrode (cathode) side through an external load, and then reacts with oxygen contained in an oxidation gas (e.g., air) to generate water. Thus, electric energy generated by consecutive electrochemical reactions.

The present applicant previously proposed a fuel cell apparatus in Japanese Application No. 10-378161. The fuel cell apparatus has a structure supplying liquid water onto the surface of air electrode for the purpose of cooling the air electrode having an exothermic reaction so as to improve power generation performance.

In a so-called water direct injection type fuel cell apparatus as proposed in the above application, feed water is controlled in accordance with temperature of the fuel cell main body so as to cool the fuel cell main body. On the other hand, a predetermined amount of process air is constantly supplied to the air electrode. In other words, the air volume delivered by the air supply system is always constant. Applicants' prior application describe influence of the sensible heat and latent heat of the water cooling the fuel cell main body. In this case, the sensible heat is that heat which is removed from the fuel cell main body without vaporization of the supplied water. On the other hand, the latent heat is heat which is removed from the fuel cell main body by vaporization of the directly injected water.

It has now been found that the latent heat of water is used to cool the fuel cell main body, and that the sensible heat makes little contribution to cooling. Therefore, in order to more effectively use the latent heat of water, in other words, in order to more effectively cool by vaporizing water supplied to the air electrode, supply amount of process air supplied to the air electrode, that is, the air volumetric flow rate should be controlled. Given, such insight applicants now recognize a number of deficiencies in the previously proposed water direct injection type fuel cell apparatus.

More specifically, when the fuel cell main body is operated at a high temperature, unless the amount of air (predetermined amount of supply) supplied to the air electrode is sufficient to properly utilize the latent heat of water, the fuel cell dries up and for this reason, the air temperature becomes high. In such a case, in order to cool the fuel cell main body, a large amount of water is supplied so as to utilize the latent heat of vaporization of water. However, in this case, a large capacity pump is required for supplying the large amount of water. The large capacity pump hinders any attempt to miniaturize the fuel cell apparatus, and a great amount of power is consumed in driving the large capacity pump, thus reducing the efficiency of the fuel cell apparatus. Moreover, when a large amount of water is supplied to the fuel cell, its process air passage fills with water, or a water membrane is formed on the surface of the air electrode, creating the possibility that the amount of oxygen necessary for the chemical reaction of the fuel cell will not be supplied to the air electrode.

On the other hand, when the fuel cell main body is operated at a low temperature, in the case where the air (predetermined amount) supplied to the air electrode is excessive, the temperature of the fuel cell main body is lowered, and there is a power loss for the fan which supplies the air.

The water evaporated at the air electrode is condensed for recycle by a condenser together with reaction water and, thereafter, is recovered. The condenser can effectively condense water when only a small amount of air is to be treated and the temperature of the air is high, in which case the capacity of the condenser can be small and the condenser small is size. In the case where the fuel cell main body is operated at a low temperature and the supply of process air is larger, a larger capacity (large size) condenser is required.

SUMMARY OF THE INVENTION

The present invention has been made taking the above-described problem in the prior art into consideration. It is, therefore, an object of the present invention to provide a fuel cell apparatus, which includes a water supply for supplying water, in liquid form, onto a surface of an air electrode of a fuel cell.

The fuel cell apparatus of the present invention further includes an air supply controller for varying the amount of process air supplied to the air electrode.

In the fuel cell apparatus constructed as described above, the amount of process air (volumetric flow rate) is variable so that it can be set to the optimum amount, whereby it is possible to sufficiently and effectively cool using the latent heat of evaporation of water supplied to the air electrode, i.e., to effectively cool the air electrode, in particular, and the fuel cell body, in general. The droplet size of the water spray ranges from 50 $\mu$m to 500 $\mu$m in order to most effectively use latent heat of evaporation of the water. Moreover, it is desirable that the thickness of the electrolyte film of the fuel cell be less than 200 $\mu$m.

More specifically, when the fuel cell main body is operated at a high temperature to reduce the temperature, the amount of air supplied per unit time, (the amount of air passing through the air chamber A—see FIG. 3) is increased, taking caution that a sufficient amount of water is supplied. In prior art apparatus wherein the supply of air is fixed the sensible heat of water is used, and a relatively large quantity of water must be supplied and for this reason, there are various problems even if the amount of air supplied is increased. In the present invention, however, almost no problem is caused even if the amount of air supplied is great. Even then, the load on the air supply device (fan, etc.) is extremely small as compared with the prior art which uses a greater amount of water.

When the fuel cell is operated at a low temperature to increase its operating temperature, the amount of the air supply is decreased. By doing so, it is possible to securely increase the temperature of the fuel cell main body, while reducing the power consumed by the air supply device to the extent possible.

Moreover, in the water recycle condenser, as the internal air temperature increases, the temperature difference between the internal and external air increases and, therefore, the capacity of the condenser can be made smaller.

According to the present invention, the air supply and the water supply are controlled independently of each other. Therefore, it is possible to independently control the required amounts of the air and water with the required timing. By doing so, it is possible to effectively obtain a high output from the fuel cell without being wasteful. Further, the amounts of air and water exiting the fuel cell apparatus are minimized and, therefore, it is possible to make the condenser small in size, and to reduce the power consumption by auxiliary equipment. Furthermore, it is possible to shorten the time required for start-up.

Figure 1:
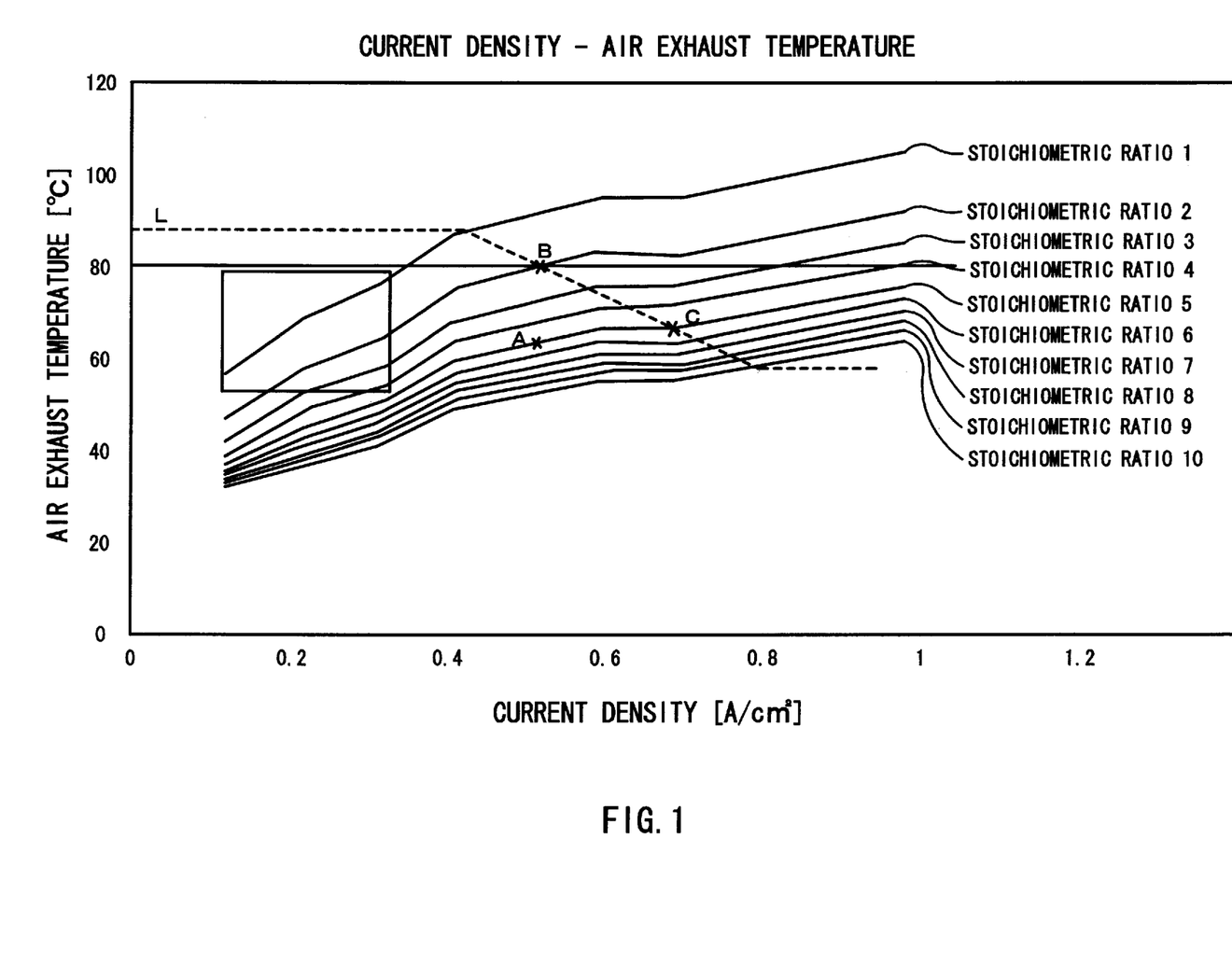
FIG. 1 is a graph showing the relationship between current density (load) of a fuel cell main body, air exhaust temperature (temperature of the main body itself) and the stoichiometric ratio (amount of air supply)

FIG. 1 is a graph showing the relationship between a load (current density) of the fuel cell apparatus and exhaust air temperature for various stoichiometric ratios. The stoichiometric ratio is a predetermined amount of air supplied to the air electrode using the amount of process air including oxygen theoretically consumed in the fuel cell reaction as a reference. Therefore, in the case of the stoichiometric ratio 1, the theortectical required minimum amount of air is supplied. In the case of the stoichiometric ratio 2, the amount of air supplied is twice that of stoichiometric ratio 1.

As seen from the graph shown in FIG. 1, as the stoichiometric ratio becomes smaller, that is, as the amount of air supply is reduced, the fuel cell apparatus is operated at a higher temperature in order to obtain the same load. The higher the operating temperature of the fuel cell apparatus, the higher the efficiency becomes. Moreover, the exhaust air temperature is increased by the high temperature operation, so that the capacity of the condenser can be made smaller. Therefore, it is preferable that the fuel cell main body be operated at the highest temperature maintaining a required load. The load and the temperature of the fuel cell main body are uniquely determined by the stoichiometric ratio; therefore, one of the load and temperature is monitored, and then, the stoichiometric ratio, that is, the amount of air supply, more specifically, the air flow rate at the air chamber inlet, is determined.

However, in a conventional fuel cell, there are various limits on the operating temperature of the fuel cell main body and on the stoichiometric ratio (amount of air supply). For example, in order to reliably prevent the fuel cell main body from becoming burned, the operating temperature of the fuel cell main body needs to be set to 100 to 80° C. or less, for example. Moreover, according to the research by the present inventors, operation of the fuel cell main body was impossible under the conditions on the upper side of the broken line L shown in FIG. 1. It is theorized that this observed inoperativeness is due to the following reasons. More specifically, when the amount of air supply is small (when the volume of air is small), air is not efficiently supplied to the air electrode due to resistance within the air supply passage and the gas diffusion layer, catalyst powder and the like.

Therefore, in FIG. 1, for example, the fuel cell main body is operable in a range of 80° C. or less and on the lower side of the broken line L. Considering its efficiency, it is preferable that the fuel cell main body be operated at the highest temperature in the above operable range.

In a vehicle fuel cell apparatus having a severe load fluctuation, the amount of air supply is changed in accordance with the required load. At that time, simultaneously, the temperature of the fuel cell main body is detected, and then, preferably, the amount of air supply is adjusted so that the highest temperature realizing the required load, that is, the minimum stoichiometric ratio can be obtained.

On the other hand, if the fuel cell apparatus is used in an environment wherein there is no load variation, only temperature of the fuel cell main body need be monitored, and then, only when the temperature changes is the amount of air supply adjusted so that the temperature is controlled as desired. More specifically, where the temperature of the fuel cell main body becomes lower than a desired temperature range, the amount of air supply is decreased so as to reduce the cooling effect of the latent heat of evaporation of water. On the other hand, in the case where the temperature of the fuel cell main body becomes higher than a desired temperature range, the amount of air supply is increased so as to enhance the cooling effect of the latent heat of evaporation of water.

The external environment and the performance of auxiliary equipment, impose various limits on the operating conditions of the fuel cell apparatus. The operating conditions of the fuel cell main body are limited to a range indicated by the square in the operable conditions shown in FIG. 1. In this range, the operating temperature of the fuel cell main body does not exceed the line of the stoichiometric ratio 1. The amount of air supply is always maintained at least at the amount corresponding to stoichiometric ratio 1 in order to ensure continuous operation of the fuel cell. Therefore, there is no need for monitoring the temperature of the fuel cell. Accordingly, only load is monitored so that the minimum amount of air capable of outputting the required load is supplied.

In all of the scenarios described above, the amount of water is continuously supplied to the air electrode is sufficient to allow for the water which is vaporized by the heat of the fuel cell and to ensure that liquid water is always present on the air electrode and in its surroundings (i.e., air chamber) during an operation of the fuel cell apparatus.

As described above, water always present in the air electrode, therefore, the latent heat of vaporization of water can be effectively used. As a result, it is possible to reduce the cooling plates in a stack of the fuel cell main body, or to omit the cooling plate altogether. However, where it is impossible to reliably provide for vaporization of a sufficient amount of water, it is preferable that the stack of the fuel cell main body be provided with a cooling plate, cooling pipe or other cooling device. The heat generated within the stack is removed to the exterior by a heat medium (usually, water) circulating through the cooling device, and the heat thus removed may be used for interior heating or the like (co-generation).

In the operation described above, the process air is substantially uncompressed, as supplied to the air electrode. However, the present invention may be applied to a fuel cell apparatus which includes a pressurized oxidizing gas supply system. The pressurized oxidizing gas supply may include a compressor or the system may become a pressurized (higher than atmospheric pressure) simply by resistance to gas flow within the system piping.

The temperature of the fuel cell main body may be measured by a thermometer attached to the fuel cell main body. As shown in FIG. 1, the temperature of exhaust air is measured, and thereby, it is possible to indirectly measure the temperature of the fuel cell main body. It is preferable to measure the temperature of the air just after being exhausted from the fuel cell main body.

The load of the fuel cell main body is a product of current and the voltage between its electrodes. The actual load presently output by the fuel cell main body is detected, and then, the detected load is used as a reference parameter to control the amount of process air. The demanded load for the fuel cell apparatus is detected, for example, as a speed, torque or accelerator opening, and then, used as the control parameter.

BRIEF DESCRIPTION OF THE DRAWINGS

The above and other objects and technical advantages of the present invention will be readily apparent from the following description of the preferred embodiments of the invention read in conjunction with the accompanying drawings, in which.

DESCRIPTION OF THE PREFERRED EMBODIMENTS

Figure 2:
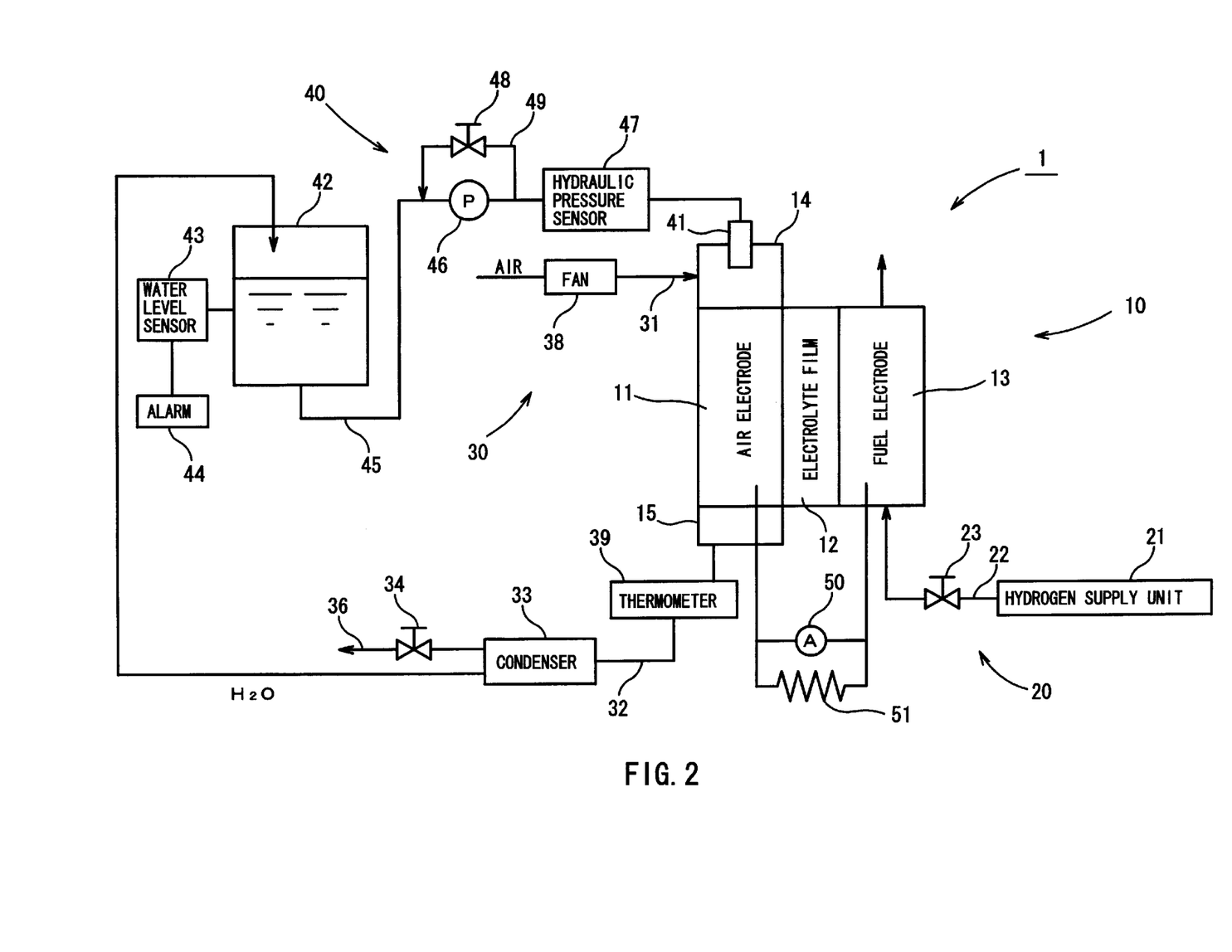
FIG. 2 is a schematic view showing structure of a fuel cell apparatus according to one embodiment of the present invention.
Figure 3:
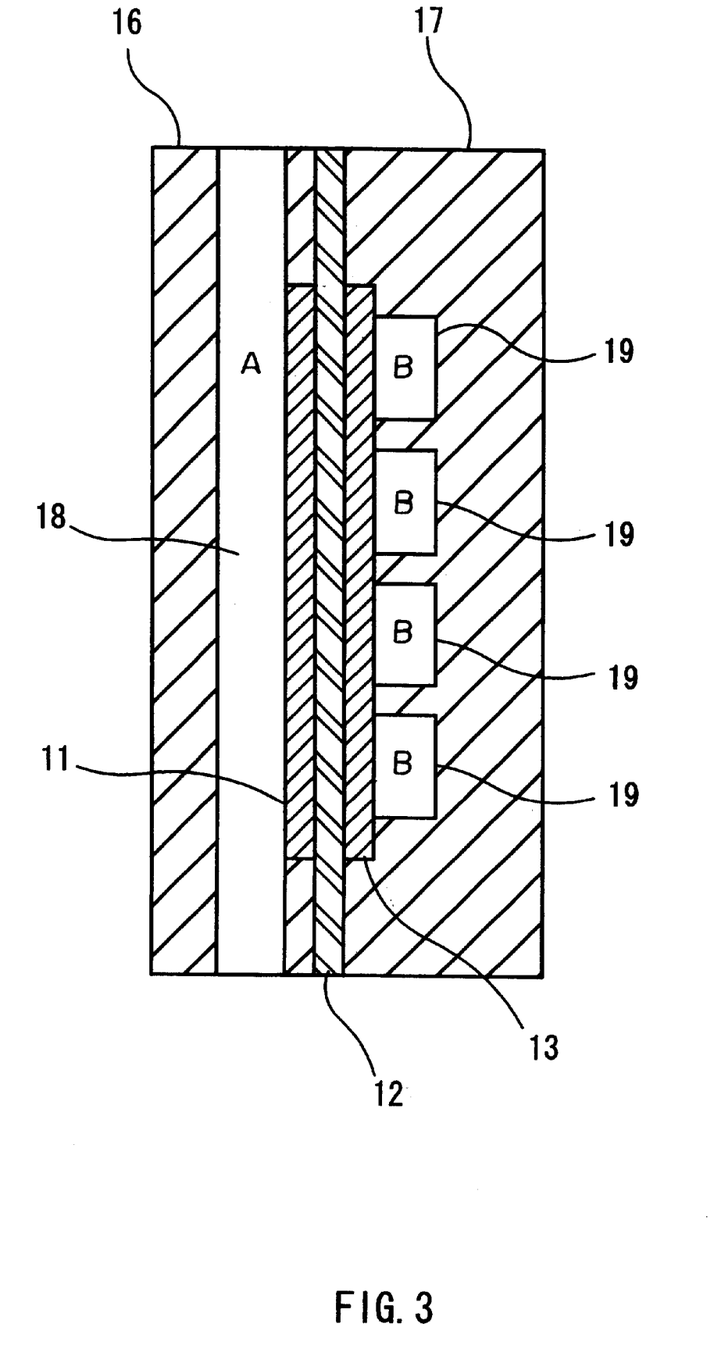
FIG. 3 is a cross sectional view of the basic structure of the fuel cell apparatus.

FIG. 2 schematically shows the structure of a fuel cell apparatus 1 according to one embodiment and FIG. 3 shows a basic unit of a fuel cell unit 10 of the apparatus 1.

As shown in FIG. 2, the fuel cell apparatus 1 is schematically composed of a fuel cell main body 10, a hydrogen gas (fuel gas) supply system 20, an air supply system 30 and a water supply system 40.

A unit fuel cell has a main body 10 including a polymer solid electrolyte film 12 held between an air electrode 11 and a fuel electrode 13. The fuel cell apparatus 1, consists of a plurality of unit fuel cells arranged in a fuel cell stack. Air manifolds 14 and 15 for intake and exhaust of air are individually formed above and below the air electrode 11. The upper-side air manifold 14 has a hole for attaching a nozzle 41. There is a limit to the injection angle of water injected from the nozzle 41, and in order to form a water mist and to spray it over the entire surface of the air electrode 11, a predetermined minimum distance is required between the nozzle 41 and the air electrode 11. Therefore, the manifold 14 becomes relatively high. On the other hand, the lower-side air manifold 15 is constructed so as to effectively discharge collected water.

The nozzle may be mounted on the side of the manifold 14. The water injected from the nozzle is sprayed throughout the manifold 14, and is thereby, spread over the entire surface of the air electrode 11. The nozzle is provided on the side of the manifold 14 so that a low manifold can be employed. By doing so, it is possible to miniaturize the fuel cell main body.

Preferably, the nozzle injects water directly toward the surface of the air electrode. By doing so, regardless of an amount of air supply, it is possible to supply a predetermined amount of water onto the surface of the air electrode. More specifically, the amount of air supply and the amount of supply water can be independently controlled. According, when a large amount of air (air volume) is supplied in start up, a desired amount of water can be reliably supplied onto the surface of the air electrode, and it is thereby, possible to reduce the start-up time.

In contrast, in systems wherein water is introduced into an air flow and supplied to the air electrode wafted on the air flow, the amount of air supply and the amount of water supply can not be controlled independently from each other. A change in the amount of air supply and the amount of water supply is not always requested at the same time, and there are situations wherein their changes are independently required. For example, in the case where a change is required with respect to only air supply, when the amount of water supply is changed, the control response of the fuel cell main body becomes late and, further, there is a possibility of a reduced output of the fuel cell apparatus.

On the contrary, in the independent supply type employed in the present invention, a required amount of water and/or air is supplied at the proper times and, therefore, it is possible to effectively control the fuel cell main body. Moreover, because the water supply and the air supply are independently controlled, it is thereby possible to prevent the air and water from being wastefully supplied and it is thereby possible to make the condensor small in capacity.

As shown in FIG. 3, the unit fuel cell is composed of the air electrode 11, the solid polymer electrolyte film 12 and the fuel electrode 13, and is formed like a thin film. Further, the unit cell is held between a pair of carbon connector plates 16 and 17. The surface of the connector plate 16 facing the air electrode 11 is formed with a plurality of grooves 18 for air ventilation. Each groove 18 is formed in a vertical direction so as to communicate with the manifolds 14 and 15. As a result, a water mist supplied from the nozzle 41 is supplied to the lower portion of the air electrode 11 along the groove 18.

An air chamber A is defined by the circumferential surface of the groove 18 and the surface of the air electrode 11. An opening portion (upper side in FIG. 3) of the air chamber A is an air inlet (upstream side opening), and an opening portion (lower side in FIG. 3) of the air chamber A is an air outlet (downstream side opening). Preferably, a thermometer is provided so as to detect exhaust temperature at the air outlet. In this embodiment, a liquid such as water or the like is injected directly into the upstream side opening. The liquid such as water or the like may be supplied from the downstream side opening. Moreover, the connector plate may be formed with a through hole extending to the right and left in FIG. 3 so that the liquid such as water can be supplied to the air chamber A therefrom. The water supplied in the above manner vaporizes on the surface constituting the air chamber A (circumferential surface of the groove 18 and the surface of the air electrode 11, which surfaces easily reach relatively high temperatures).

Likewise, the surface of the connector plate 17 facing the fuel electrode 13 is formed with a groove 19 for passage of hydrogen gas. In this embodiment, a plurality of grooves 19 is horizontally formed. A fuel chamber B is defined by the circumferential surface of the groove 19 and the surface of the connector plate 17. Water may be supplied to the fuel chamber B by the same method as to the air chamber A already described.

The air electrode 11 is formed of a water-tight material. If a water film forms on the air electrode 11, the effective area of the air electrode 11 is reduced and, for this reason, the material forming the air electrode 11 is required to be highly water repellent. A gas diffusion layer is used as the material forming the air electrode 11. The gas diffusion layer is formed by using carbon as a base material, and by a coating, such as C+PTFE thereon.

As the solid polymer electrolyte film 12, a NAFION (Trade name: Dupont company) thin film may be used.

The thickness of the film is not limited so long as reverse osmosis of generated water from the air electrode side is possible.

The fuel electrode 13 is formed of the same material as the air electrode 11, because it is used common with the other components.

In the air electrode 11 and the fuel electrode 13, a known platinum-based catalyst of a proper thickness is uniformly dispersed on their surfaces in contact with the electrolyte film 12 in order to facilitate the reaction of oxygen with hydrogen and, thus, is formed as a catalyst layer of the air electrode 11 and the fuel electrode 13.

In this embodiment, a hydrogen source made of hydrogen storage alloy is used as the hydrogen supply 21 of the hydrogen gas supply system 20. Alternatively, a cylinder of liquid hydrogen may be used. In another alternative water/methanol liquid is reformed and reacted in a reformer so as to generate a hydrogen rich reforming gas, and then, the reforming gas is stored in a tank for use as a hydrogen source. Of course, in the case of using the fuel cell apparatus 1 stationary within a room, hydrogen may be piped in for use as a hydrogen source.

The hydrogen supply device 21 and the fuel electrode 13 are connected by a hydrogen gas supply passage 22 via a hydrogen supply pressure control valve 23. The pressure control valve 23 controls the pressure of hydrogen gas supplied to the fuel electrode 13.

Exhaust gas from the fuel electrode 13 is discharged to the exterior or may be supplied to the air manifold so as to be mixed with incoming air.

Atmospheric air is supplied to the air electrode 11 by a fan 38. In FIG. 2, reference numeral 31 denotes an air supply passage which is connected to the manifold 14 of the air electrode 11. The lower side manifold 15 is connected with an air passage 32 for circulating or exhausting air passing through the air electrode 11, and an exhaust gas is sent to an exhaust passage 36 via a condenser 33 for separating water.

The amount of exhaust air discharged from the exhaust passage 36 is controlled by an air exhaust control valve 34. In this case, the air exhaust control valve 34 is omitted and the exhaust gas may be discharged to the atmosphere as is.

In the air supply system 30, no air compressor is provided and atmospheric pressure is maintained throughout the whole system.

In FIG. 2, reference numeral 39 denotes a thermometer for detecting temperature of the discharged air.

Water separated by the condenser 33 is sent to a tank 42. The tank 42 is provided with a water level sensor 43 and when a water level in the tank 42 reaches a predetermined value or less, an alarm 44 is sounded and/or flashed by the water level sensor 43 so as to inform an operator of a shortage of water. Preferably, operation of the condenser 33 is variable so as to control the amount of water recovered. More specifically, when water is short, rotational speed of the fan of the condenser 33 is increased so as to recover a large amount of water. On the other hand, when the amount of recovered water is excessive, the rotational speed of the fan of the condenser 33 is decreased or stopped so as to reduce the amount of water recovered.

The water supply system 40 of this embodiment includes a water supply passage 45 from the tank 42 which is connected to the nozzle 41 via pump 46, a hydraulic pressure sensor 47 and a pressure control valve 48. The pressure of the water is controlled by the pressure control valve 48 and, thereafter, is sprayed out of the nozzle 41 to thus form a mist in the air manifold 14. Then, the water mist is supplied onto the entire surface of the air electrode 11 by spraying, the weight of the mist, an air flow or the like. The control of supply of water is not limited to the combination of the pressure control valve and the nozzle.

In the above manner, when the water is supplied onto the surface of the air electrode 11, the supplied water absorbs heat from the surrounding air, the surface of the air electrode 11 and the surface of the separator, as latent heat as it vaporizes. By doing so, it is possible to prevent the water content of the electrolyte film 12 from being lost.

Moreover, the water supplied to the air electrode 11 absorbs heat from the air electrode 11 as latent heat and therefore effects the cooling of the air electrode 11. In particular, in start up, when the water is supplied, it is possible to prevent a film and catalyst from being damaged by combustion of hydrogen and air.

In FIG. 2, reference numeral 50 denotes an ampere meter which measures current between the air electrode 11 and the fuel electrode 13. The current density shown in FIG. 1 is calculated from a current measured by the ampere meter 50. In this embodiment, a resistor 51 is constant; therefore, a current between the air electrode 11 and the fuel electrode 13 is measured, and thereby, the load (=work) on the fuel cell main body 10 can be calculated.

In the case of use of the fuel cell apparatus in a vehicle, current and voltage between the two electrodes are measured to obtain the load (presently output power of the fuel cell main body). In the case of a vehicle, it is possible to estimate the power required of the fuel cell main body from torque or accelerator opening.

Operation of the fuel cell apparatus 1 of this embodiment will now be described with reference to FIGS. 4 and 5.

Figure 4:
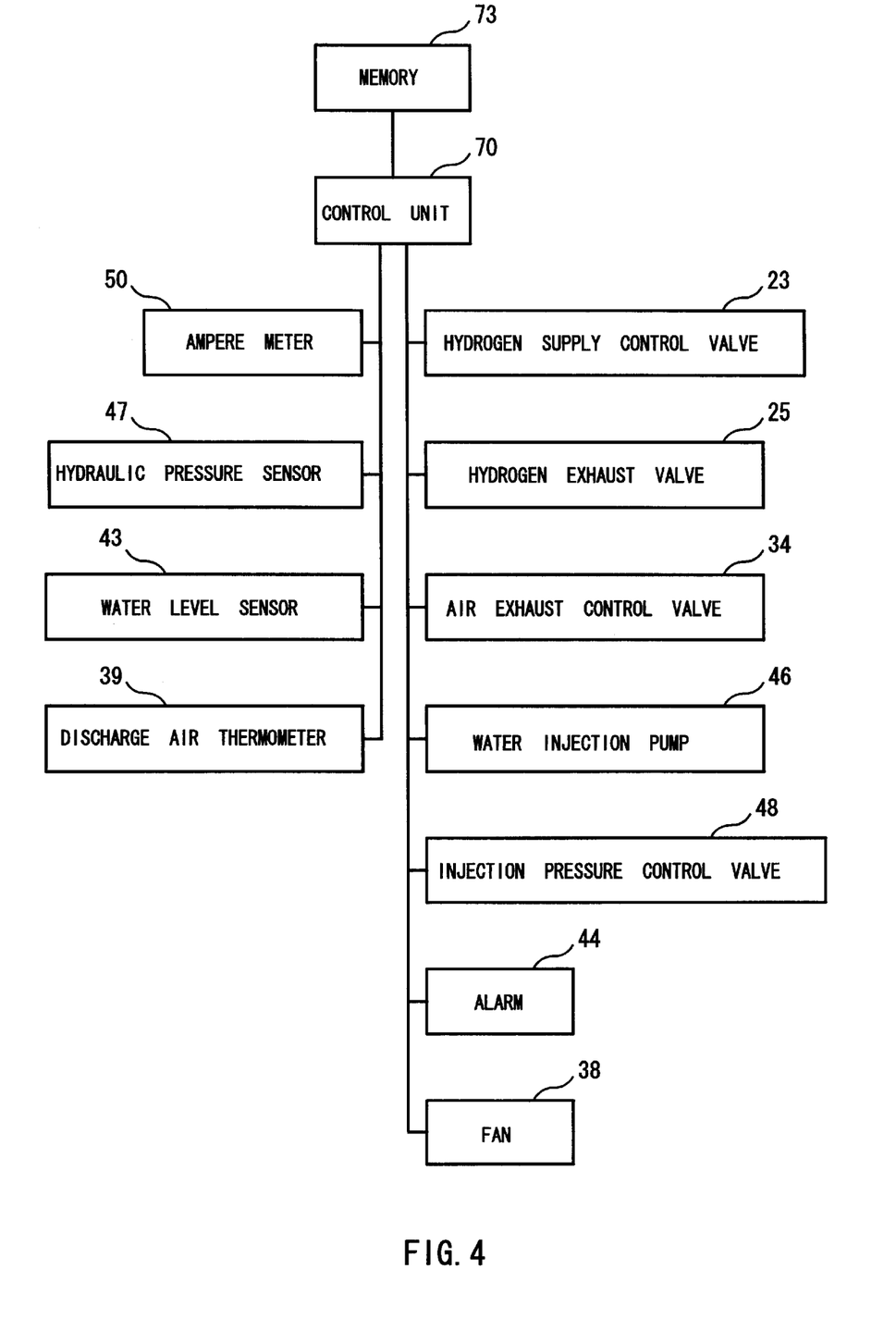
FIG. 4 is a schematic view showing a control system for the fuel cell apparatus.

In FIG. 4, the control unit 70 and a memory 73 are commonly housed in a control box (not shown in the drawings) of the fuel cell apparatus 1. The memory 73 stores a control program for controlling operations of the control unit 70 (comprising a computer) and parameter data and look-up tables for executing the various control routines.

Figure 5:
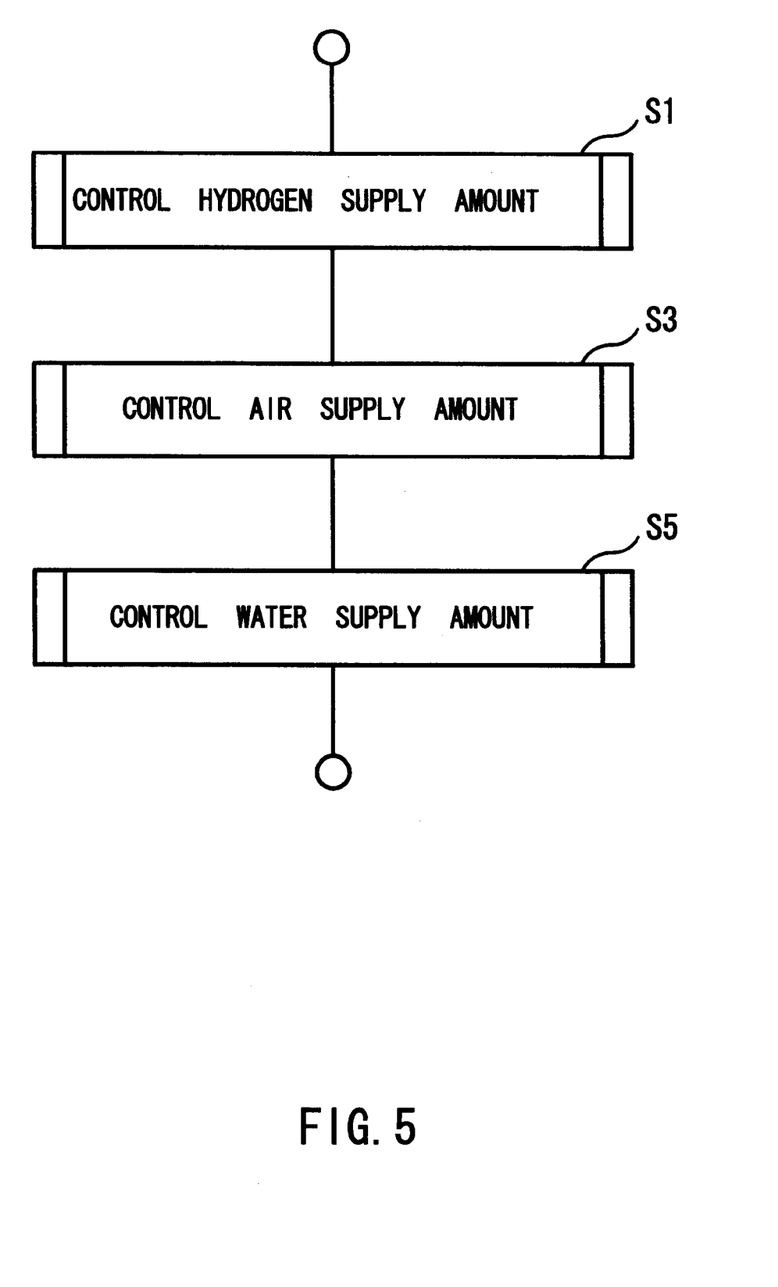
FIG. 5 is a flowchart showing a main routine for operation of the fuel cell apparatus.

Control of the hydrogen gas supply system 20 in start-up is executed as step S1 of FIG. 5. In start-up, hydrogen exhaust valve 25 is closed and hydrogen supply control valve 23 is adjusted so that hydrogen gas is supplied to the fuel electrode 13 to provide a predetermined concentration below the explosive limit at the fuel electrode 13. When the fuel cell apparatus 1 is operated with the hydrogen exhaust valve 25 closed, $N_2$, $O_2$ and the water of reaction transmitted through the air electrode tend to gradually reduce the partial pressure of hydrogen consumed in the fuel electrode and to thereby reduce the output voltage so that a stable voltage can not be obtained. In order to solve this problem, the hydrogen exhaust valve 25 is opened sufficiently, in accordance with a predetermined control routine, to exhaust the gas in which the hydrogen partial pressure is reduced and to thereby allow fresh fuel gas to reach the fuel electrode 13.

This predetermined control routine is stored in the memory 73, and the control unit 70 reads it from the memory 73 for control of opening and closing of the hydrogen exhaust valve 25 and adjustment of the hydrogen supply control valve 23.

In this embodiment, the output current is monitored by the ampere meter 50, and then, when the output current decreases to a predetermined threshold value, the hydrogen exhaust valve 25 is released for a predetermined time (e.g., one second).

Alternatively, the fuel cell apparatus 1 may be operated with the hydrogen exhaust valve 25 normally closed, and an actual time interval in which the output voltage will start to decline is predetermined. Then, the opening and closing of the hydrogen exhaust valve 25 is intermittently controlled so that the valve 25 is opened at the end of each time interval which is substantially the same as the actual time interval or a period slightly shorter than that.

Figure 6:
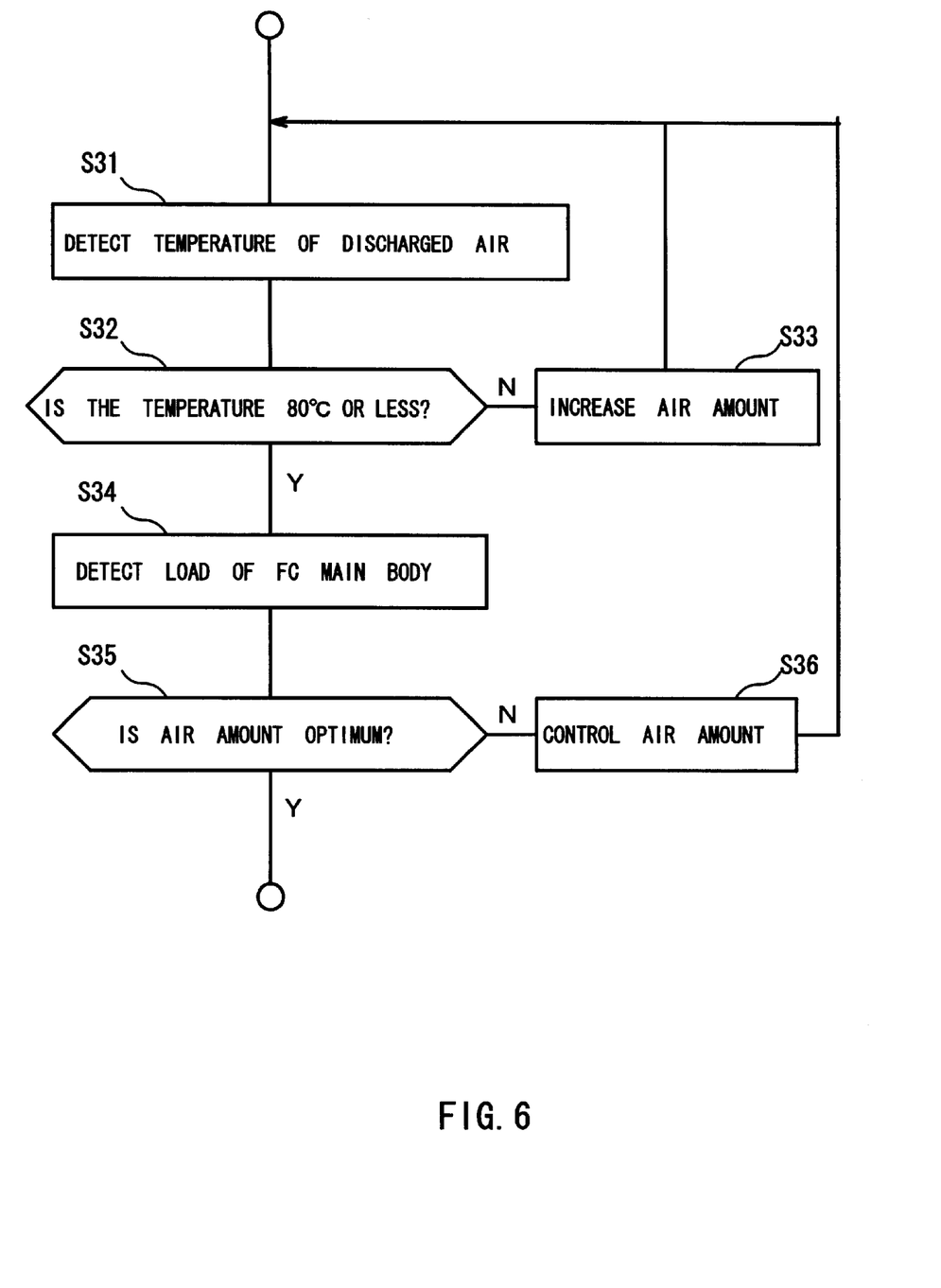
FIG. 6 is a flowchart of a routine for operation of an air supply system.

Control of start-up operation of the air supply system 30 is executed as step S3 of FIG. 5 and will be described below with reference to FIG. 6.

In step S31,the thermometer 39 detects the temperature of exhaust air just after being discharged from the fuel cell main body 10. When the detected temperature exceeds 80° C. (step S32), there is the possibility that the fuel cell main body 10 might be burned. For this reason, rotational speed of the fan 38 is increased so as to increase the amount of air (step S33), and, it is thereby possible to reduce the temperature of the air electrode 11 which is a heat generator. In this case, of course, a water required for cooling the fuel cell main body 10, overheated a temperature exceeding 80° C., is supplied to the air electrode 11.

In normal operation where the detected temperature is 80° C. or less, the load of the fuel cell main body 10 is detected (step S34) and in this embodiment, the relationship shown in FIG. 1 is used for control. If the amount of air is mot optimum (step S35), then it is controlled (step S36). Therefore, the current between the air electrode 11 and the fuel electrode 13 is detected by the ampere meter 50 and the control unit 70 calculates (operates) a current density from the detected current. Further, the control unit 70 collates the current density value and the temperature detected in step S31 with the relationship of FIG. 1 stored in the memory 73 in the form of a table.

For example, in the case where the relationship between the detected temperature and the current density is the condition A shown in FIG. 1, the amount of air is reduced, and then, the operating state of the fuel cell main body 10 is changed to that of condition B shown in FIG. 1. More specifically, the amount of air supply is decreased to an amount corresponding to the stoichiometric ratio 2 so as to reduce cooling by latent heat. By doing so, the fuel cell main body 10 is operated at the highest temperature at which its output (current density) can be maintained. In this case, in order to effectively increase the temperature of the fuel cell main body 10, the initial amount of air is preferably made smaller than that corresponding to the stoichiometric ratio 2 but not below a level where the fuel cell main body would be short of oxygen, and then, the rate of temperature rise is increased so as to approach temperature (approximately, 80° C.) of the condition B, and thereafter, the amount of air is made to correspond to the stoichiometric ratio 2.

In this case, the memory 73 prestores the relationship between the amount of supply air (stoichiometric ratio) and rotational speed of fan 38, and the control unit 70 controls the rotational speed of the fan 38 so that the amount of air corresponds to the required amount. For example, a servo motor drive type fan may be used as the fan 38.

In the case where the current density of the fuel cell main body 10 operating at the condition B changes to 0.7, the fuel cell main body 10 needs to be operated at the condition C. In this case, the amount of air is increased up to the amount of air of the condition C(corresponding to the stoichiometric ratio 5) so as to reduce the temperature of the fuel cell main body 10 to the temperature (approximately, 70° C.) of the condition C.

As described above, the operating temperature of the fuel cell main body 10 is preferably set to the highest possible temperature in the operable range.

Start-up of the water supply system 40 executed in step S5 of FIG. 5. Water from the tank 42 is supplied by using the pump 46. Then, the pressure of the water is adjusted by an injection pressure control valve 48, and is sprayed from the nozzle 41. By doing so, the water is supplied to the air electrode 11 in a liquid state (mist). Of course, the injection pressure control valve 48 may be omitted and, instead, the voltage applied to the pump 46 may be adjusted so as to control the discharge pressure of the pump 46. Using either method, a desired amount of water is sprayed onto the air electrode 11.

The amount of water supply is predetermined in accordance with the temperature of the fuel cell main body. More specifically, in order to maintain the temperature of the fuel cell main body at the predetermined temperature, the least amount of water necessary is supplied. This serves to reduce power consumed by the pump 46 as much as possible. In this case, when the fuel cell main body becomes less than a predetermined temperature (e.g., 30° C.), the supply of water is then stopped. The memory 73 stores the relationship between the temperature of the fuel cell main body 10 and the amount of water to be supplied.

Figure 7:
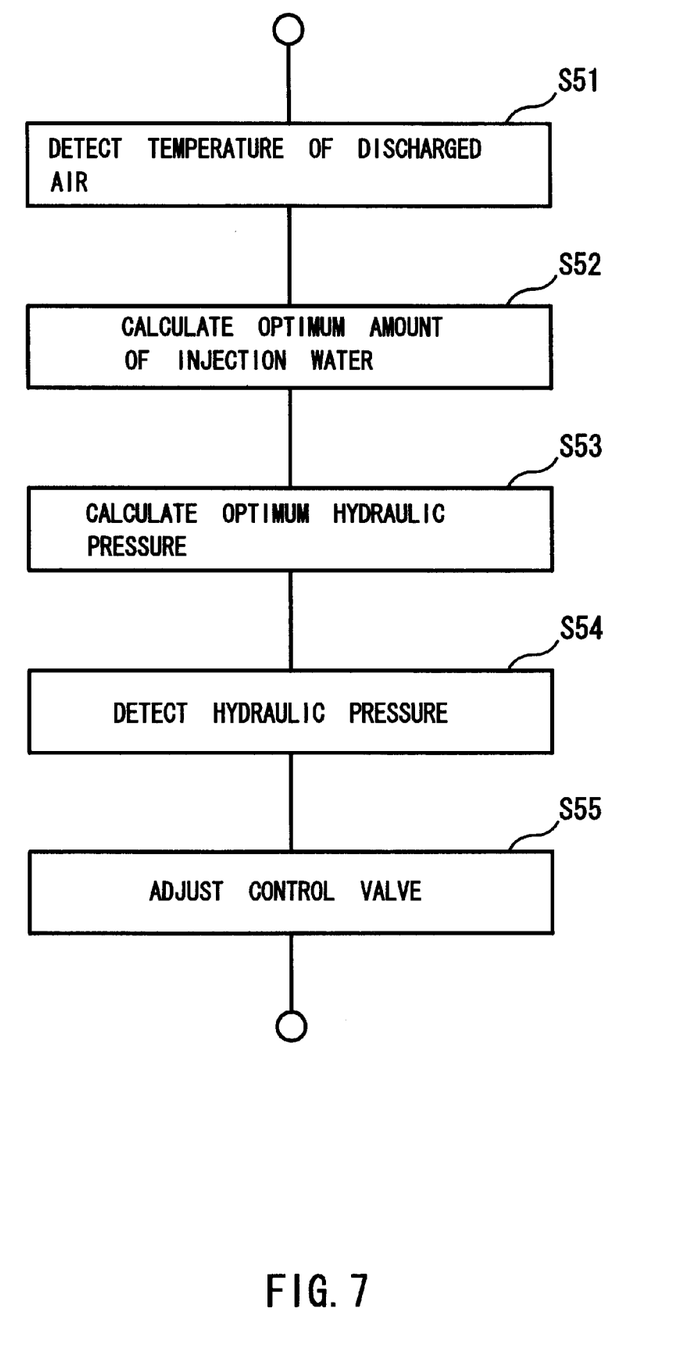
FIG. 7 is a flowchart of a routine for operation of a water supply system.

In this embodiment, as shown in FIG. 7, the temperature of the exhaust air is first detected (step S51). Subsequently, an optimum amount of injection water is calculated on the basis of the detected temperature (step S52) or made by reference to the predetermined relationship stored in the memory 73.

Figure 8:
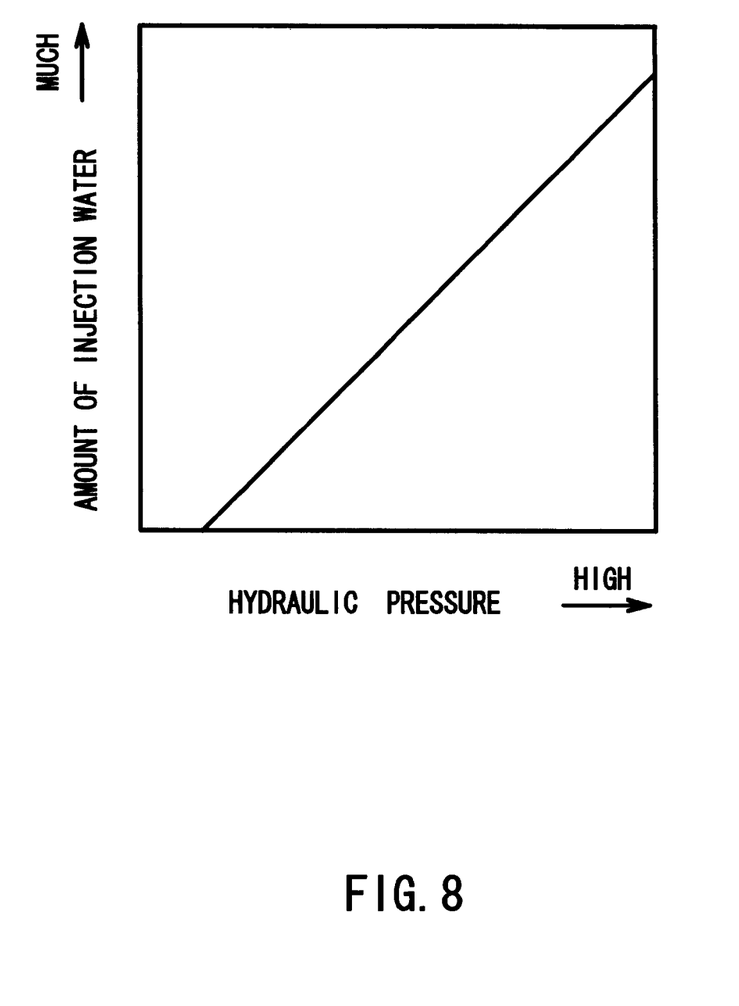
FIG. 8 is a graph showing a relationship between water injection and hydraulic pressure.

Next, in step S53, an optimum hydraulic pressure corresponding to the optimum amount of injection water is calculated. For example, the amount of injection water and the hydraulic pressure have a relationship as shown in FIG. 8, which relationship is prestored in the memory 73 in the form of an equation or look-up table.

In this embodiment, the pump 46 is operated at constant power and hydraulic pressure at the nozzle 41 is controlled by operation of a pressure control valve 48 in a by-pass 49. More specifically, as the opening of the pressure control valve 48 is increased, the hydraulic pressure at the nozzle 41 is decreased.

Therefore, in step S54, the hydraulic pressure sensor 47 detects the hydraulic pressure applied at the nozzle 41, and then, the pressure control valve 48 is controlled so that the hydraulic pressure is set to a desired value (optimum hydraulic pressure) by a feedback control (step S55).

Alternatively, with each lapse of a predetermined time interval (e.g., 5 to 10 seconds), the water supply system 40 may be operated at a reset, constant hydraulic pressure.

Figure 9:
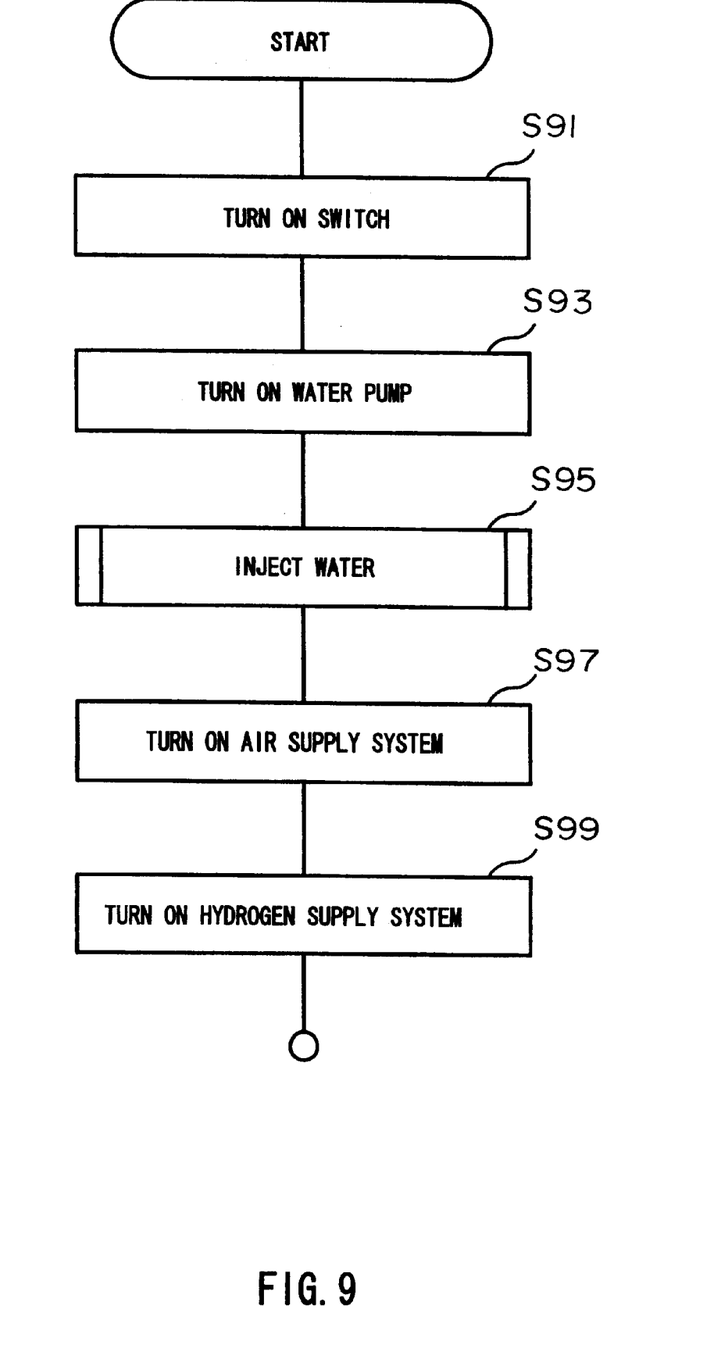
FIG. 9 is a flowchart of a control routine for fuel cell start up.

In start-up of the fuel cell apparatus 1 itself, as shown in FIG. 9, when a switch (not shown) is turned on (step S91), the pump 46 is turned on (step S93). Subsequently, the pressure control valve 48 is controlled so that a predetermined amount of injection water is supplied to the nozzle 41 (step S95). In order to protect the fuel cell main body 10 from an abnormal reaction, the amount of water sprayed onto the air electrode 11 is set to the maximum amount.

Thereafter, the air supply system 30 is turned on (step S97). At that time, the speed of the fan 38 is set to the maximum so as to cool the fuel cell main body 10, and thereby, prevent an abnormal reaction. Subsequently, the hydrogen supply system 20 is turned on (step S99).

The desired output voltage between the air electrode 11 and the fuel electrode 13, is confirmed and, thereafter, the electric power is output from the apparatus.

In the above embodiment, the air supply system 30 may be operated before the start of operation of the water supply system 40. Moreover, the air supply system 30 may be operated after the start of operation of the hydrogen supply system 20.

However, in this case, the water supply system 40 must be operated before the start of the hydrogen supply system 20 because air exists in the fuel cell main body 10 regardless of operation of the air supply system 30; and if hydrogen were to be supplied with the electrolyte film 12 in a dry state, there would be the possibility of abnormal combustion. In the case where an abnormal amount of heat is generated, in order to protect the fuel cell main body 10 against damage, water is injected before hydrogen is supplied whereby the air electrode 11 is wet. By doing so, the abnormal heat is converted into latent heat by evaporation of water so as to facilitate wetting of the electrolyte film 12, and thereby, it is possible to prevent the fuel cell main body 10 from being damaged.

Another embodiment will now be described below with reference to FIGS. 10 to 12. In this case, like reference numerals are used to designate the same components and steps as in the above embodiment already described, and details of such duplicated features are omitted.

Figure 10:
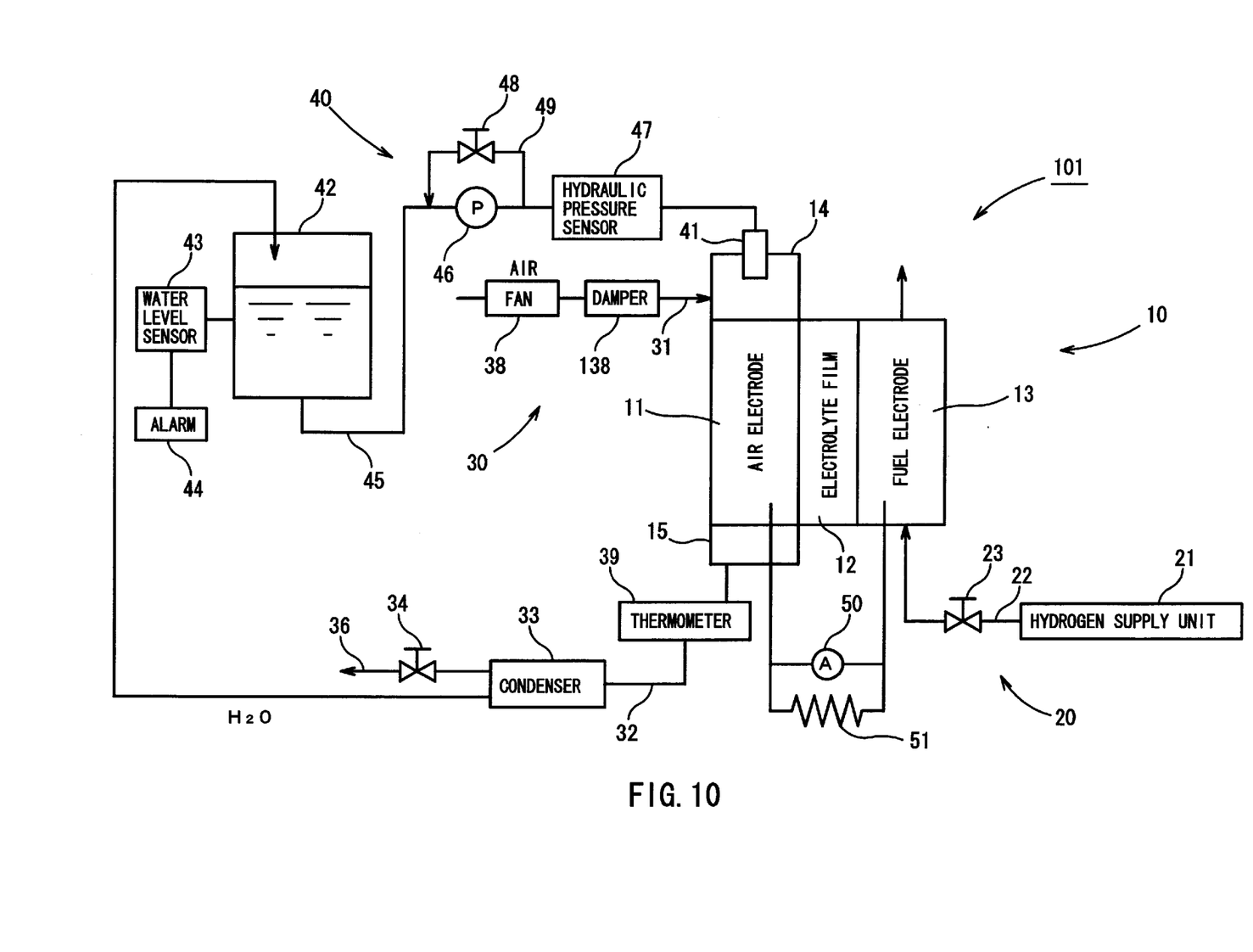
FIG. 10 is a schematic view showing the structure of a fuel cell apparatus according to another embodiment of the present invention.
Figure 11:
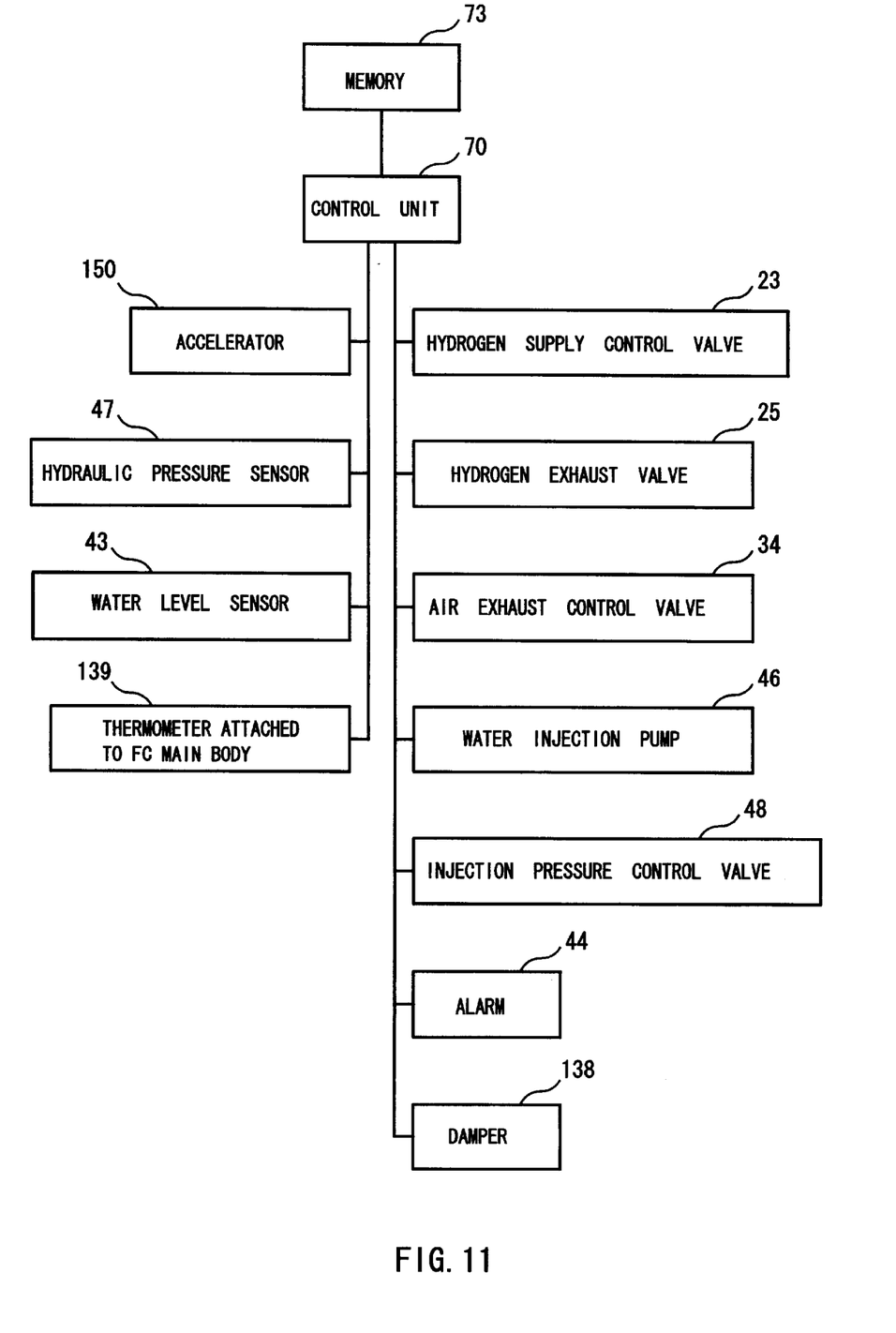
FIG. 11 is a schematic view of a control system for the fuel cell apparatus shown in FIG. 10.
Figure 12:
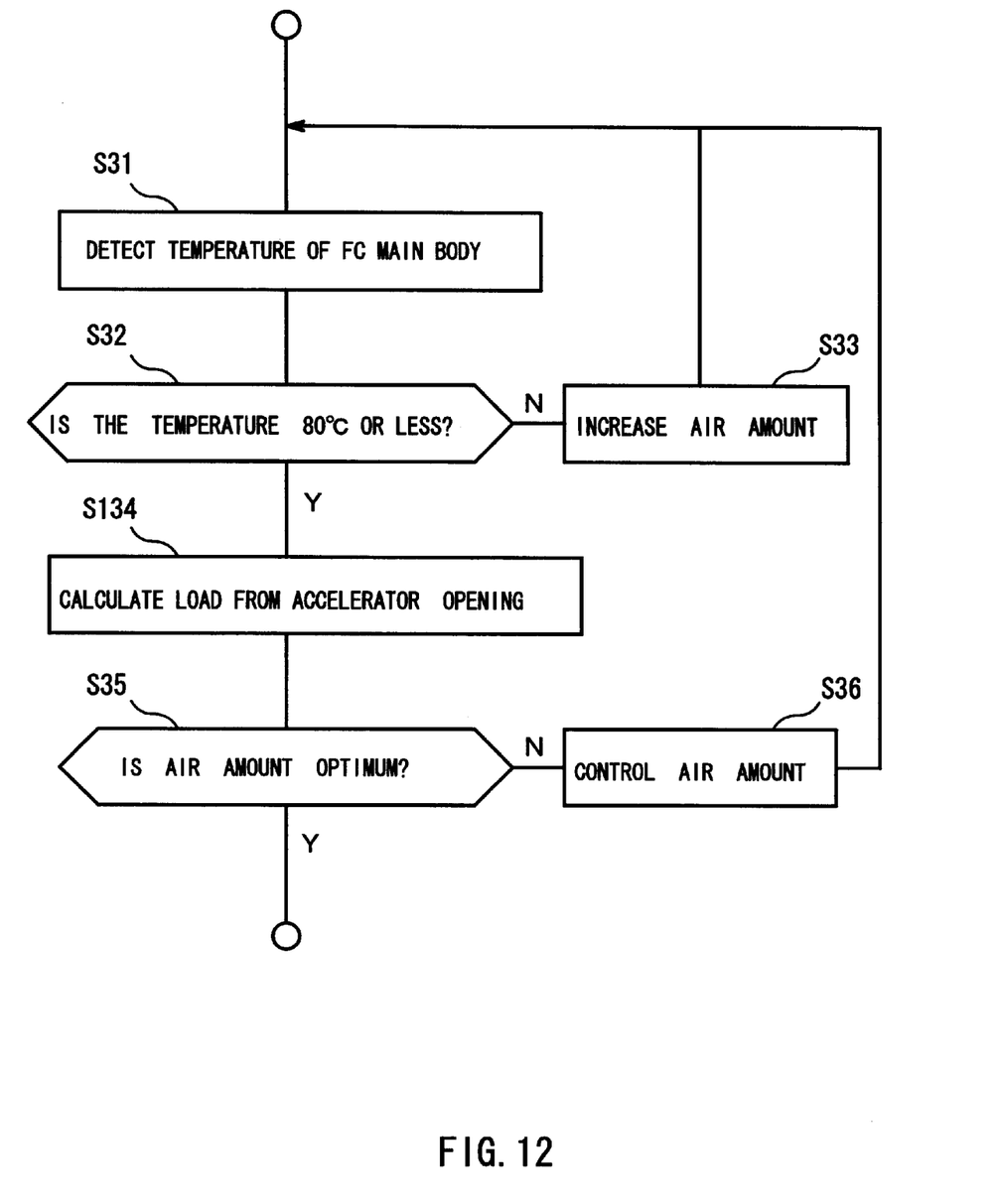
FIG. 12 is a flowchart of a routine for operation of an air supply system for the fuel cell apparatus shown in FIG. 10.

In the fuel cell apparatus 101 of the embodiments of FIGS. 10–12, a damper 138 is provided on the downstream side of the fan 38. The fan 38 is driven at a constant rotational speed and the damper 138 is controlled to regulate an amount of air supply. Further, a thermometer 139 is attached to the fuel cell main body 10, preferably to the connector plate on the air electrode side, so as to directly measure temperature of the fuel cell main body 10. Furthermore, in this embodiment, vehicle accelerator opening is detected, and the control unit 70 calculates the load required of the fuel cell main body 10 from the detected opening (in FIG. 12, step S134). In this case, in step S134, the control unit 70 converts the obtained load into a current density so as to use the relationship shown in FIG. 1.

According to the above embodiment, a load required for the fuel cell main body is read directly from the detected state of the accelerator 150 and, therefore, it is possible to more quickly control the amount of air supply.

Other operations and effects of the above embodiment are the same as those of the previously-described embodiment.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A fuel cell apparatus comprising:
water supply means for spraying liquid water onto a surface of an air electrode of a fuel cell main body and onto a wall surface of a connector plate facing the air electrode;
water supply control means for controlling the amount of liquid water sprayed by said water supply means;
air supply means for supplying process air to the air electrode,
air supply control means for controlling the amount of process air supplied by said air supply means;
wherein said water supply control means and said air supply control means are operable independently of each other.

2. The fuel cell apparatus according to claim 1, further comprising:
temperature detecting means for detecting temperature of the fuel cell main body;
load detecting means for detecting a load of the fuel cell main body; and
wherein said air supply control means controls the amount of process air based on the detected temperature and the detected load.

3. The fuel cell apparatus according to claim 2, wherein the temperature detecting means detects temperature of process air discharged from the fuel cell main body.

4. The fuel cell apparatus according to claim 2, wherein the load detecting means detects a present load applied to the fuel cell main body.

5. The fuel cell apparatus according to claim 2, wherein the load detecting means detects a load commanded for the fuel cell main body.

6. The fuel cell apparatus according to claim 2, further comprising a memory for storing a relationship between optimum amounts of process air supply, and temperature and load of the fuel cell main body, and
wherein the air supply control means refers to the stored relationship to determine an optimum amount of process air supply corresponding to the temperature and load of the fuel cell main body, and controls the air supply means so that the optimum amount of process air is supplied.

7. The fuel cell apparatus according to claim 2, wherein said water supply control means controls the supply of liquid water responsive to the detected temperature of the fuel cell main body.

8. The fuel cell apparatus according to claim 6, further comprising a second memory for storing a relationship between temperatures of the fuel cell main body and minimum amounts of feed water required for maintaining the respective temperatures; and
wherein said water supply control means refers to the relationship stored in said second memory to determine minimum amount of liquid water to be supplied to the air electrode at the detected temperature of the fuel cell main body.

9. The fuel cell apparatus according to claim 1, further comprising:

temperature detecting means for detecting temperature of the fuel cell main body; and wherein said air supply control means controls the amount of process air based on the detected temperature.

10. The fuel cell apparatus according to claim 1, further comprising:

load detecting means for detecting a load of the fuel cell main body; and wherein said air supply control means controls the amount of process air based on the detected load.

11. The fuel cell apparatus according to claim 1, wherein said water supply means includes a nozzle for ejecting water directly onto a surface of said air electrode of said fuel cell main body.

12. A method of operating a fuel cell apparatus, comprising:

supplying water to a surface of an air electrode of a fuel cell main body so that said surface receives the water in liquid state; and controlling an amount of process air supplied to the air electrode independently from the supply of water.

13. The method of operating a fuel cell apparatus according to claim 12 further comprising:

detecting a temperature of the fuel cell main body;

detecting a load of the fuel cell main body; and controlling the amount of process air supplied on the basis of the detected temperature and load.

14. The method of operating a fuel cell apparatus according to claim 13, wherein the temperature of the fuel cell main body is detected as the temperature of process air discharged from the fuel cell main body.

15. The method of operating a fuel cell apparatus according to claim 13, wherein the detected load is a load presently applied to the fuel cell main body.

16. The method of operating a fuel cell apparatus according to claim 13, wherein the detected load is a load commanded of the fuel cell main body.

17. The method of operating a fuel cell apparatus according to claim 13, wherein a relationship between optimum amounts of air supply correlated with values for temperature and load of the fuel cell main body is stored in memory and referred to determine an optimum amount of air supply corresponding to the detected temperature and load of the fuel cell main body, and wherein the process air is controlled so as to supply the thus determined optimum amount.

18. The method of operating a fuel cell apparatus according to claim 13, wherein an amount of water supplied to the air electrode is controlled responsive to the detected temperature of the fuel cell main body.

19. The method of operating a fuel cell apparatus according to claim 17, wherein the detected temperature is applied to a predetermined relationship between temperature of the fuel cell main body and minimum amount of feed water required for maintaining that temperature to determine a minimum amount of water corresponding to the detected temperature, and wherein the thus determined minimum amount of water is supplied to the air electrode.

20. The method of operating a fuel cell apparatus according to claim 12, wherein a temperature of the fuel cell main body is detected, and wherein the supply of process air is controlled responsive to the detected temperature.

21. The method of operating a fuel cell apparatus according to claim 12, wherein a load of the fuel cell main body is detected, and wherein the supply of process air is controlled responsive to the detected load.

22. A fuel cell apparatus comprising:

water supply means for supplying water to an air chamber of a fuel cell main body in a liquid state;

air supply means for supplying an amount of air per unit time through the air chamber; and control means for controlling the water supply means and the air supply means independently of each other.

23. A method of operating a fuel cell apparatus comprising:

supplying water to an air chamber of a fuel cell main body in a liquid state;

supplying air to the air chamber; and controlling amounts of the water and air supplied independently of each other.

\* \* \* \* \*